US005347585A

United States Patent [19]

Taki et al.

[11] Patent Number: 5,347,585

[45] Date of Patent: Sep. 13, 1994

[54] SOUND ATTENUATING SYSTEM

[75] Inventors: Masao Taki; Takuji Mori, both of Tokyo; Shuntaro Murakami, Kanagawa, all of Japan

[73] Assignees: Calsonic Corporation; Nishiwaki Laboratory, Tokyo, Japan

[21] Appl. No.: 756,233

[22] Filed: Sep. 10, 1991

[51] Int. Cl.[5] ..................... H04B 15/00

[52] U.S. Cl. ..................... 381/71; 381/94

[58] Field of Search ..................... 381/71, 72, 94

[56] References Cited

U.S. PATENT DOCUMENTS 2,043,416 6/1936 Lueg ..................... 179/1
4,044,203 8/1977 Swinbanks ..................... 179/1
4,109,108 8/1978 Coxon et al. ..................... 179/1
4,122,303 10/1978 Chaplin et al. ..................... 179/1
4,348,750 9/1982 Schwind ..................... 381/160
4,473,906 9/1984 Warnaka et al. ..................... 381/71
4,527,282 7/1985 Chaplin et al. ..................... 381/71
4,665,549 5/1987 Eriksson et al. ..................... 381/158
4,815,139 3/1989 Eriksson et al. ..................... 381/94

FOREIGN PATENT DOCUMENTS 2507428 8/1975 Fed. Rep. of Germany .
3144052 7/1982 Fed. Rep. of Germany .

OTHER PUBLICATIONS

Eghtesadi, et al., "The Tight-Coupled Monopole Active Attenuator in a Duct", Noise Control Engineering Journal, Jan.-Feb. 1983, vol. 20, pp. 16-20.

*Primary Examiner*—John K. Peng
*Assistant Examiner*—Edward Lefkowitz
*Attorney, Agent, or Firm*—Foley & Lardner

[57] ABSTRACT

A sound attenuating system for attenuating sound from a sound source. The system comprises a main conduit through which the sound from the sound source propagates; a first device for defining in the conduit at least one passive acoustic reflecting surface; and a second device for defining in the conduit a plurality of active acoustic reflecting surfaces. The active acoustic reflecting surfaces are of a type which permits a partial permeation of sound therethrough.

23 Claims, 4 Drawing Sheets

SOUND ATTENUATING SYSTEM

BACKGROUND OF THE INVENTION

1. Field of the Invention

The present invention relates in general to sound attenuating systems, and more particularly to sound attenuating systems on a type which ms designed to have both passive and active acoustic reflecting surfaces for achieving appropriate sound attenuation.

2. Description of the Prior Art

Hitherto, for reducing noise propagating in a given conduit, various passive type silencers have been proposed and put into practical use, which are of an expansion type, resonance type, interference type, acoustic absorption type and the like. In these passive type silencers, within a conduit in which noise propagates, there is provided a surface of discontinuity of acoustic impedance to form an acoustic reflecting surface by which a part of acoustic energy is reflected toward a sound source. Furthermore, in such silencers, noise suppression is achieved by using an interference of the acoustic wave in the conduit.

Recently, a so-called "active noise control" which uses active acoustic conductance has been developed. In this control, a noise or sound (primary sound) which is to be attenuated is overlapped with another sound (secondary sound) which has a phase opposite to that of the primary sound. This control is disclosed in U.S. Pat. No. 2 043 416 granted in 1934 to P Lueg. If the method disclosed by this patent is carried out theoretically, a perfect noise reflecting surface should be produced for a broad band of sound frequency to achieve a perfect noise suppression.

Among the active noise control, widely used currently for noise attenuation in a conduit system are the methods which are based on the measure disclosed by the above U.S. Patent. That is, the sound pressure of a primary sound at a secondary sound source (viz., loudspeaker) is calculated by carrying out a digital signal treatment on a reference signal issued from a sound detector (viz., microphone) located upstream of the secondary sound source. By using the sound pressure thus calculated, a secondary sound having a phase opposite to that of the primary sound is produced for cancellation of the primary sound.

Theoretically, a perfect cancellation of the primary sound is obtained when the secondary sound has an amplitude equal to that of the primary sound and a phase properly reversed to that of the primary sound, that is, when a perfect sound reflecting surface is produced on the secondary sound source. This means a formation of an acoustic wave blocking surface at the secondary sound source for the perfect cancellation of the primary sound. That is, theoretically, when the perfect sound reflecting surface is produced, propagation of acoustic wave is not permitted in a region downstream of the sound reflecting surface. Accordingly, in this theoretical case, the secondary sound source is only the element which is to be taken into consideration.

In addition to the above-mentioned active control method, a so-called "Tight-Coupled Monopole Method" was proposed by K. H. Enhtesadl et al in 1983. In this method, a microphone nor detecting a reference signal and a loudspeaker for serving as a secondary sound source are arranged at the same position. This method is advantageous in that the method is hardly affected by disturbance of the acoustic wave propagation in the conduit system and can bring about production of a sound attenuating device which is simple in construction. A similar method was proposed by Olsen in 1953.

However, the methods of the above-mentioned active noise control have the following drawbacks due to their nature.

First, the frequency band which permits formation of the perfect noise reflecting surface is not sufficiently broad and the acoustic absorption is poor. This means that there is inevitably created a frequency band within which a negative noise reduction (viz., noise increase) appears. Furthermore, if a sufficient sound attenuating effect is intended, the arrangement of the various elements in the conduit system becomes complicated and thus pressure loss in the conduit system becomes marked.

Second, as is described hereinabove, formation of the perfect noise reflecting surface is possible only in theory. From a practical point of view, production of a real device employing such theory is impossible. That is, due to interference of a reflected acoustic wave at a downstream side of a secondary sound source and of an acoustic wave which has been reflected from an upstream side of the conduit system, the device fails to exhibit a satisfied acoustic attenuation.

Third, usually, in the conventional active noise control methods, the reference signal used for deriving the sound pressure of the primary sound at the secondary sound source is detected by a microphone which is positioned away from the secondary sound source. However, as is known, the propagation characteristic of the acoustic wave varies in accordance with the temperature of gas in the conduit system and the velocity at which the gas flows therethrough. This characteristic change causes production of an error which appears when a deviation of the secondary sound for cancelling the primary sound is carried out. Hitherto, adaptive signal processing has been used for dealing with this undesired matter. However, even this processing can not deal with a rapid change of the gas temperature and the gas velocity. Furthermore, the electric system for treating the signals becomes complicated.

Fourth, as is described hereinabove, the active noise control using the "Tight-Coupled Monopole Method" is the method which aims at formation of the perfect noise reflecting surface. Accordingly, in this control, it is necessary to reverse the phase of an acoustic signal detected by a microphone and infinitely amplify the signal by using an amplifier with an infinite gain. However, in practical use, due to the nature of the phase characteristic, undesired oscillation is inevitably produced. Accordingly, the formation of the perfect noise reflecting surface is not realized.

The above-mentioned matters to which the conventional sound attenuating systems are subjected will be itemized in the following.

(1) In the passive type silencers, the arrangement of elements in the conduit system is complicated and thus the pressure loss in the system becomes marked.

(2) The passive type silencers for attenuating low frequency acoustic waves have an inevitably bulky construction.

(3) When applied to wide band acoustic wave, the passive type silencers are forced to produce a band in which negative noise reduction (viz., noise increase) appears.

(4) The active type silencers hitherto proposed are those which aim at formation of the perfect noise reflecting surface. However, the formation of such a surface is impossible in practical. Due to interference of various elements in the conduit system, including a terminal end of the conduit system, such silencers fail to exhibit a satisfaction acoustic attenuating performance.

(5) In active type silencers of a type in which with a microphone for detecting a reference signal and a loudspeaker for producing a secondary sound are positioned away from each other in the main conduit, the propagation characteristic of the acoustic wave varies in accordance with the temperature of gas in the conduit system and the velocity at which the gas flows therethrough. In order to deal with this characteristic change, adaptive signal processing has been used. However, this processing requires a very complicated electronic system and thus it is very difficult to put this system into practical use.

(6) The "Tight-Coupled Monopole Method" can solve the drawback mentioned in the item (5). However, due to its nature, undesired oscillation tends to occur.

(7) In the active type silencers of the type wherein active elements are arranged in a main conduit of the conduit system, it is necessary to use a material which can bear the gas flowing through the main conduit of the system. That is, in the conduit system through which high temperature gas and/or corrosive gas flows, conventional microphones and speakers can not be used.

SUMMARY OF THE INVENTION

It is therefore an object of the present invention to provide a sound attenuating system which is provided by taking the above-mentioned facts into consideration.

According to the present invention, there is provided a sound attenuating system which can exhibit a satisfied sound attenuating performance throughout a wide acoustic band.

According to a first aspect of the present invention, there is provided a sound attenuating system for attenuating sound from a sound source. This system includes: a main conduit through which the sound from the sound source propagates; first means for defining in the conduit at least one passive acoustic reflecting surface; and second means for defining in the conduit a plurality of active acoustic reflecting surfaces, wherein the active acoustic reflecting surfaces are of a type which permits a partial permeation of sound therethrough.

According to a second aspect of the present invention, there is provided a sound attenuating system for attenuating sound issued from a sound source. This system includes a main conduit through which the sound from the sound source propagates; a passive silencer operatively installed in the main conduit thereby to define at least two passive acoustic reflecting surfaces at front and rear portions of the passive silencer; and a pair of branched conduit systems arranged on the passive silencer to define an active acoustic reflecting surface in the passive silencer. Each branched conduit system includes: a branched conduit connected to the main conduit; a sound detecting sensor installed in the branched conduit for detecting a reference signal based on a signal from the sound source; a secondary sound source installed in the branched conduit for issuing a secondary sound when driven; and a signal processing unit for driving the secondary sound source by processing the reference signal. The branched conduit systems are constructed so that the active acoustic reflecting surface thus produced in the passive silencer permits a partial permeation of sound therethrough.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
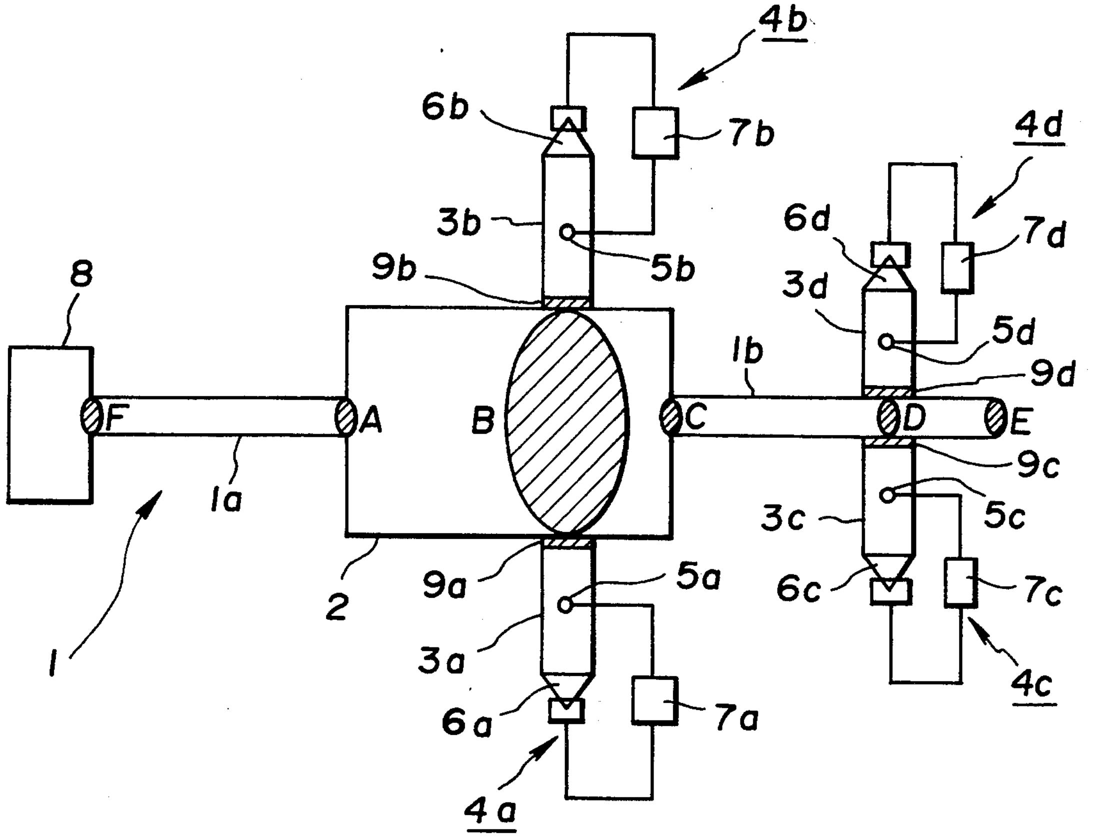
FIG. 1 shows a sound attenuating system of a first embodiment of the present invention.

Referring to FIG. 1 of the accompanying drawings, there is shown a first embodiment of the present invention, which is a sound attenuating system.

The sound attenuating system of this embodiment comprises generally a main conduit system 1 which includes front and rear smaller conduits 1*a* and 1*b* and a passive type silencer 2 (viz, expansion chamber) interposed between the front and rear conduits 1*a* and 1*b*. As will be clarified as the description proceeds, sound which is to be attenuated propagates in the main conduit system 1 in the direction from the front smaller conduit 1*a* to the rear smaller conduit 1*b*. The passive type silencer 2 is equipped with a pair of branched conduit systems 3*a* and 3*b* each having an active element 4*a* or 4*b*. Similarly, the rear smaller conduit 1*b* is equipped with a pair of branched conduits systems 3*c* and 3*d* each having an active element 4*c* or 4*d*.

As shown, these systems and parts are combined and arranged to produce a plurality of acoustic reflecting surfaces A, B, C, D, E and F.

Designated by numeral 8 is a primary sound source to which an upstream end of the main conduit system 1 is connected.

The active element 4*a*, 4*b*, 4*c* or 4*d* of each branched conduit system 3*a*, 3*b*, 3*c* or 3*d* comprises a microphone 5*a*, 5*b*, 5*c* or 5*d*, a loudspeaker (viz., secondary sound source) 6*a*, 6*b*, 6*c* or 6*d* and a signal processing and amplifying unit 7*a*, 7*b*, 7*c* or 7*d*.

It is to be noted that the acoustic reflecting surfaces F, A, C and E are of a passive type and the other reflecting surfaces B and D are of an active type. Due to their nature, the active acoustic reflecting surfaces B and D are not of a perfect noise reflecting surface.

In each active element 4, a signal received by the microphone 5 is suitably processed and amplified by the signal processing and amplifying unit 7 and then issued from the loudspeaker 6.

In the present invention, a Low Gain Tight-Coupled Monopole (which will be referred to as LTCM hereinafter) is employed. That is, the microphone 5 is mounted on the loudspeaker 6. The gain of the amplifying unit 7 is controlled to a low level, for example, to a level below 20 dB to suppress generation of oscillation. It is to be noted that in the afore-mentioned conventional sound attenuating system, the "Tight-Coupled Monopole" which aims to produce a perfect noise reflecting surface is used, which induces the afore-mentioned drawbacks.

If desired, in place of the above-mentioned LTCM, another active element may be employed in which the reference signal is detected at a position nearer to the main conduit system 1 than the position where the illustrated microphone 5 is positioned.

Furthermore, if desired, each branched conduit system 3 may further include a passive element. That is, between the microphone 5 and the loudspeaker 6, there may be arranged a conduit or the like.

As has been described hereinabove, the active acoustic reflecting surfaces B and D produced by the active elements 4 are not of the perfect noise reflecting surface which is a surface impossible to produce. That is, the reflecting surfaces B and D are those which permit partial reflection, absorption and permeation of an acoustic wave.

That is, in the present invention, interference between the reflected waves from the active acoustic reflecting surfaces B and D and the passive acoustic reflecting surfaces A, C, E and F is positively used.

Each branched conduit system 3 has a member for insulating the corresponding active element 4 from a gas flow in the main conduit system 1.

In order to protect the microphone 5 and the loudspeaker 6 from the heat possessed by gas flowing in the main conduit system 1, a heat insulating material 9 is mounted to an inlet part of each branched conduit system 3. If desired, a cooler may be arranged at such part for assuring the protection of them.

If the gas which flows in the main conduit system 1 is a high temperature gas and/or corrosive gas, a glass wool or the like is preferably used as the material 9, which can prevent penetration of the gas into the branched conduit system 3.

It is to be noted that the length of each branched conduit system 3 is determined with reference to a sound attenuating performance needed and a degree of influence from the gas which flows in the main conduit system 1. Thus, if the influence by the gas is negligibly small, the length of the branched conduit system 3 can be 0 (zero) permitting a direct mounting of the LTCM on the main conduit system 1. In this case, sound attenuating effect is optimally achieved.

It is further to be noted the passive acoustic reflecting surfaces are not only the surfaces F, A and C which are the discontinuities of acoustic impedance produced by the expansion and contraction parts formed in silencers of expansion type, resonance type, interference type, and acoustic absorption type, but also the open surface E defined at the terminal end of the main conduit system 1.

In the following, operation of the sound attenuating system of the first embodiment will be described with reference to FIG. 1.

The acoustic wave produced at the primary sound source 8 propagates in the main conduit system 1 and is reflected by the three passive acoustic reflecting surfaces A, C and E which are formed at the inlet and outlet portions of the expansion chamber 2 and the terminal end of the main conduit system 1 and the two active acoustic reflecting surfaces B and D which are formed between the paired branched conduit systems **3*a* and 3*b* and between the other paired branched conduit systems 3*c* and 3*d***.

During this sound propagation, there occurs an interference between forward acoustic waves and backward acoustic waves in the main conduit system 1. If the sound source 8 is subjected to a wave reflection, the acoustic reflecting surface F at the upstream end of the main conduit system 1 has a certain effect on the wave interference.

At the active acoustic reflecting surfaces B and D, acoustic absorption is partially carried out.

With this, the sound produced by the primary sound source 8 is attenuated and emitted from the terminal end of the main conduit system 1.

In the following, modifications of the present invention will be described.

Although in the above-mentioned first embodiment, the microphone 5 is mounted on the loudspeaker 6, these two devices 5 and 6 may be located at spaced positions. If desired, adaptive signal processing may be used for processing the signals. Furthermore, if desired, each branched conduit system 3 may include a passive element.

The distance between the microphone 5 and the loudspeaker 6 and the positional relationship therebetween are determined in accordance with a sound attenuating performance needed. Thus, even when the length of the branched conduit system 3 is maintained constant, the resonant frequency of the system 3 can be adjusted by changing the distance and the positional relationship between the microphone 5 and the loudspeaker 6.

As an example of the active element 4, an arrangement may be employed in which the LTCM is located at a terminal end of each branched conduit system 3 and the gain of the LTCM is set at 0.5. In this case, the terminal end of the branched conduit system 3 has no acoustic reflecting surface and a levelled sound attenuating characteristic is achieved throughout a wide frequency band of noise. Furthermore, in this case, there is no limitation on the length of the branched conduit system 3 and thus reduction of the influence by the gas flow in the main conduit system 1 against the loudspeaker 6 becomes easily achieved.

If the characteristic of the signal processing and amplifying unit 7 is changed, the characteristic of the acoustic reflecting surface of each branched conduit system 3 must also change. When, for example, the LTCM is located at the terminal end of the branched conduit system 3 and the gain of the LTCM is set at a suitable level other than the above-mentioned level (viz., 0.5), the sound transmission loss of the branched conduit system 3 brings about a resonance characteristic. That is, when the gain of the LTCM is changed to a suitable level, the sharpness of the resonance is changed and an inversion between the resonance and the anti-resonance is achieved. Furthermore, the tuning of the resonance frequency is achieved by changing the phase characteristic of the signal processing and amplifying unit 7.

If desired, more than two branched conduit systems 3 may be arranged around the passive silencer 2 or around the second smaller conduit **1*b***. With this arrangement, the sound attenuation is much more effectively carried out without increasing the size of the entire of the sound attenuating system.

In case wherein the sound from the primary sound source 8 changes its characteristic widely, the gain of the amplifier of each active element 4 and the characteristic of the corresponding signal processing and amplifying unit 7 should be totally controlled.

If desired, the expansion chamber 2 of the sound attenuating system may be filled with a sound absorption and heat insulating material, such as a glass wool or the like, to promote the sound attenuating effect of the system.

Figure 2:
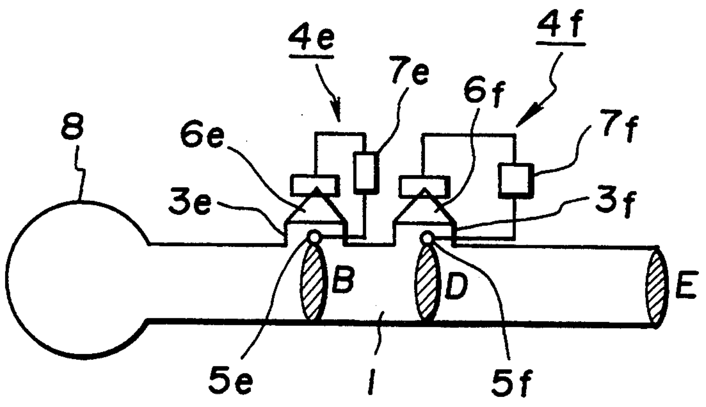
FIG. 2 shows a sound attenuating system of a second embodiment of the present invention.

Referring to FIG. 2 of the drawings, there is shown a second embodiment of the present invention.

In this second embodiment, there is no means which corresponds to the expansion chamber 2 employed in the first embodiment of FIG. 1. As shown in FIG. 2, two branched conduit systems 3*e* and 3*f* are arranged at axially spaced portions of the main conduit system 1, which form the active acoustic reflecting surfaces B and D. Thus, in this embodiment, two active acoustic reflecting surfaces B and D and one passive acoustic reflecting surface E are provided.

Figure 3A:
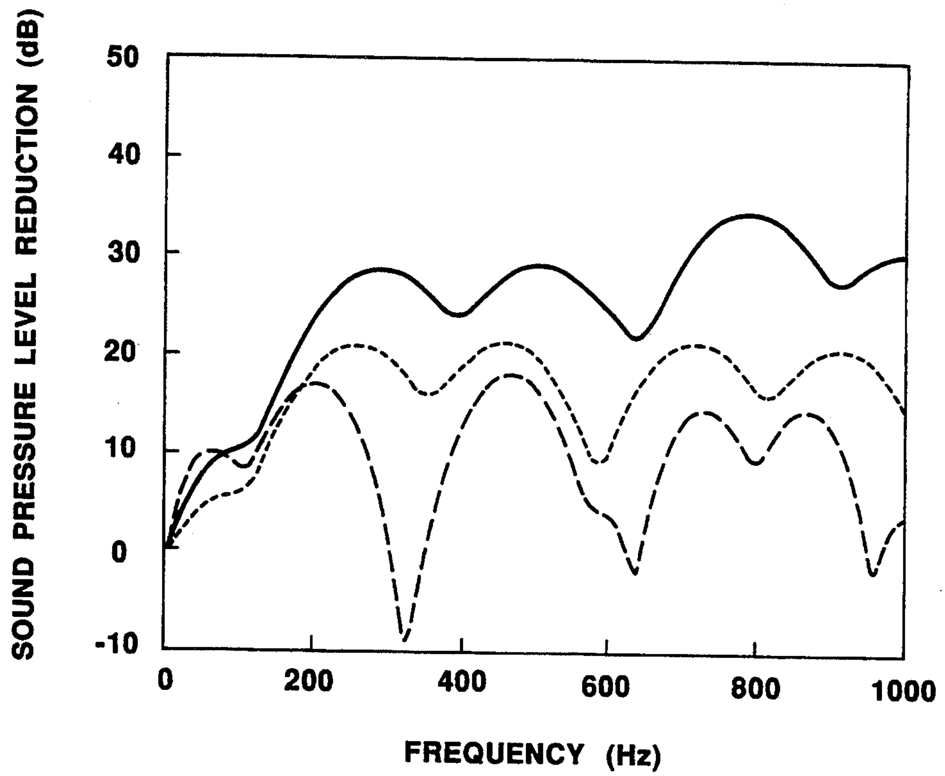
FIG. 3A is a graph depicting an estimated sound attenuating performance of the second embodiment.

FIG. 3A is a graph showing an estimated performance of the sound attenuating system of the second embodiment of FIG. 2. The curve drawn by a broken line shows the estimated attenuation achieved by the second embodiment, while, the other curves drawn respectively by a solid line and a dash-dash line show the estimated attenuations achieved by two other sound attenuating systems of a type similar to the second embodiment, one system (viz., the system exhibiting the performance depicted by the solid line curve) being a system having three active acoustic reflecting surfaces and the other system (viz., the system exhibiting the performance depicted by the dash-dash line curve) being a system having only one active acoustic reflecting surface.

As will be understood from this graph, in case of the system having only one active acoustic reflecting surface, very poor attenuation zones appear periodically. However, with increase in number of the active acoustic reflecting surfaces, such undesired zones tend to disappear. This means that even when each active acoustic reflecting surface fails to have a perfect acoustic reflecting surface, a satisfied attenuation is obtained by a combination of a plurality of active acoustic reflecting surfaces.

Figure 3B:
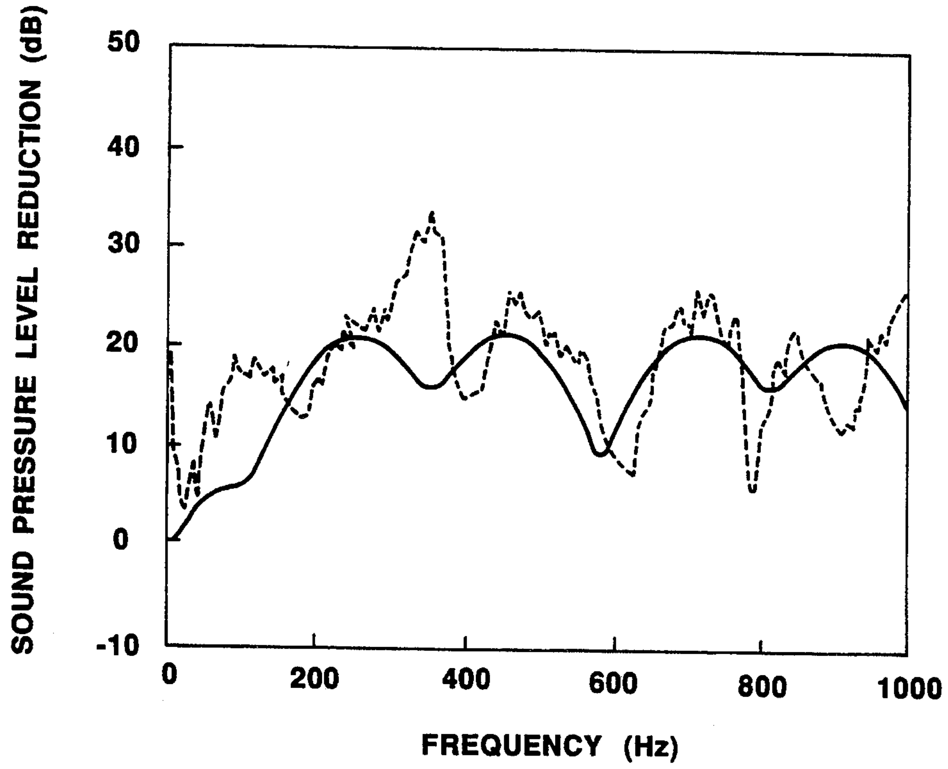
FIG. 3B is a graph depicting a measured sound attenuating performance of the second embodiment.

FIG. 3B is a graph showing a measured performance of the sound attenuating system of the second embodiment of FIG. 2. That is, the curve drawn by a broken line shows the measured attenuation achieved by the system of the second embodiment, while, the curve drawn by a solid line shows the estimated attenuation achieved by the second embodiment. The length of each branched conduit system 3 was 10 mm and thus the length could be negligible in view of the measuring range. As will be understood from the graph of FIG. 3B, the estimated performance and the measured performance have a considerable correlation.

Figure 4:
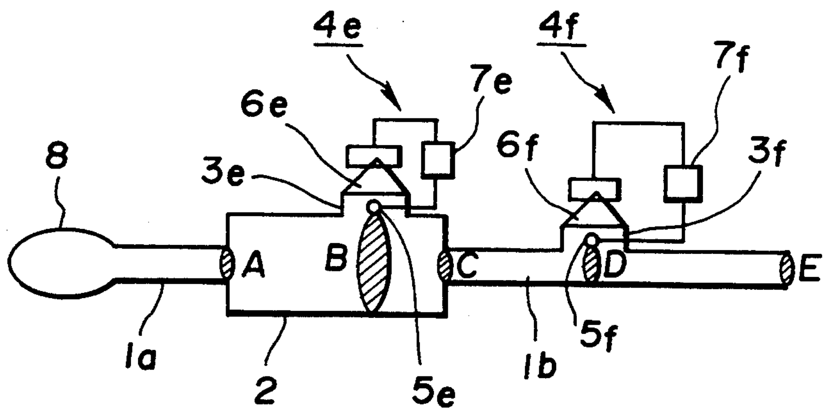
FIG. 4 shows a sound attenuating system of a third embodiment of the present invention.

Referring to FIG. 4, there is shown a third embodiment of the present invention.

This embodiment is substantially the same as the second embodiment except for presence of an expansion chamber 2. That is, in this third embodiment, a part of the main conduit system 1 to which the forward branched conduit system 3*e* is located forms an expansion chamber 2. Thus, in this embodiment, two active acoustic reflecting surfaces B and D and three passive acoustic reflecting surfaces A, C and E are provided. If desired, the expansion chamber 2 may be filled with a sound absorption and heat insulating material, such as a glass wool or the like, to promote the sound attenuating effect of the sound attenuating system.

Figure 5:
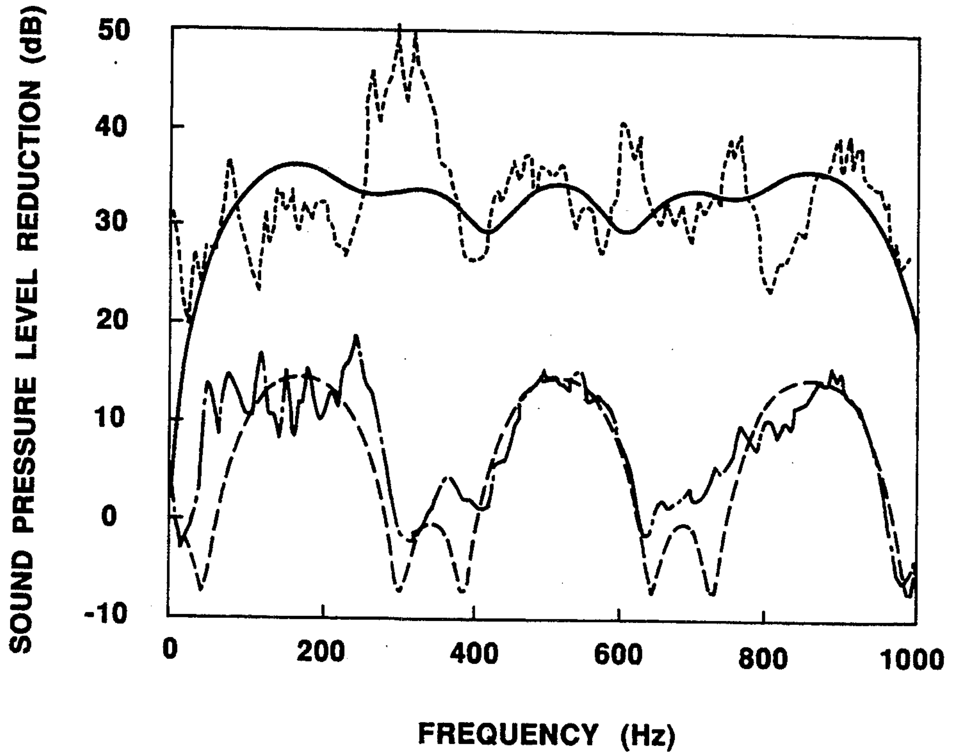
FIG. 5 is a graph showing estimated and measured sound attenuating performances of the third embodiment.

FIG. 5 is a graph showing estimated and measured performances of the sound attenuating system of the third embodiment of FIG. 4. That is, the curve drawn by a solid line shows the estimated attenuation achieved by the third embodiment, while, the curve drawn by a broke line shows the measured attenuation achieved by the same. For comparison, two additional results are also shown in the graph. That is, the curve drawn by a dash-dash line shows the estimated attenuation achieved by a system which has only the passive acoustic reflecting surfaces A, C and E, and the curve drawn by a dash-dot line shows the measured attenuation achieved by the system. As will be understood from the graph of FIG. 5, the estimated performance and the measured performance have a considerable correlation.

As will be seen from the graph of FIG. 5, due to provision of the active acoustic reflecting surfaces, a satisfied attenuation is achieved throughout a broad band of frequency.

What is claimed is:

1. A sound attenuating system for attenuating sound issued from a sound source, comprising:
- a main conduit through which the sound from said sound source propagates;
- a passive silencer operatively installed in said main conduit thereby to define at least two passive acoustic reflecting surfaces at front and rear portions of said passive silencer; and
- a pair of branched conduit systems arranged on said passive silencer to define an active acoustic reflecting surface in said passive silencer, each branched conduit system including
  - a branched conduit connected to said main conduit,
  - a secondary sound source installed in said branched conduit for issuing a secondary sound when driven,
  - a sound detecting sensor installed in said branched conduit at a location between said secondary sound source and said main conduit, said sound detecting sensor detecting a reference signal based on a signal from said sound source, and
  - a signal processing unit for driving said secondary sound source by processing said reference signal, wherein said branched conduit systems are so constructed that said active acoustic reflecting surface thus produced in said passive silencer permits a partial permeation of sound therethrough.

2. A sound attenuating system as claimed in claim 1, further comprising another pair of branched conduit systems which are arranged on said main conduit at a position downstream of said passive silencer to define an active acoustic reflecting surface in said main conduit.

3. A sound attenuating system as claimed in claim 2, in which the branched conduit systems of said another branched conduit system are so constructed that the active acoustic reflecting surface thus produced in the main conduit permits a partial permeation of sound therethrough.

4. A sound attenuating system for attenuating sound issued from a sound source, comprising:
- a main conduit through which sound from said sound source propagates;
- means for providing in said main conduit at least one passive acoustic reflecting surface;

a branch conduit extending from a side of said main conduit;

a sound detecting sensor installed in said branch conduit for detecting a reference signal based on a signal from said sound source;

a secondary sound source installed in said branch conduit issuing a secondary sound when driven, a distance between said side of said main conduit and said secondary sound source being greater than a distance between said side of said main conduit and said sound detecting sensor; and a signal processing unit for driving said secondary sound source by processing said reference signal, wherein said sound detecting sensor, said secondary sound source and said signal processing unit are arranged such that an active acoustic reflecting surface thus provided in said main conduit permits a partial permeation of sound therethrough.

5. A sound attenuating system as claimed in claim 4, in which said passive acoustic reflecting surface is a part of a passive silencer.

6. A sound attenuating system as claimed in claim 4, in which said passive acoustic reflecting surface is defined at a terminal end of said conduit.

7. A sound attenuating system as claimed in claim 5, in which said passive silencer is of an expansion type.

8. A sound attenuating system as claimed in claim 7, in which the expansion type silencer is filled with a sound absorption material.

9. A sound attenuating system as claimed in claim 4, further comprising:

a second branched conduit connected to said main conduit;

a second sound detecting sensor installed in said second branched conduit for detecting a second reference signal based on said signal from said sound source;

a second secondary sound source installed in said second branched conduit for issuing a second secondary sound when driven; and a second signal processing unit for driving said second secondary sound source by processing said second reference signal.

10. A sound attenuating system as claimed in claim 4, in which said secondary sound source is installed in a terminal end of said branched conduit.

11. A sound attenuating system as claimed in claim 9, in which the length of each of said branched conduit and said second branched conduit is approximately 10 mm.

12. A sound attenuating system as claimed in claim 9, in which said branched conduit and said second branched conduit are arranged on opposite sides at substantially the same portion of said main conduit.

13. A sound attenuating system as claimed in claim 4, in which said sound detecting sensor and said secondary sound source are located at substantially the same position in said branched conduit and in which said signal processing unit is set to have a low gain such that oscillation generation is suppressed.

14. A sound attenuating system as claimed in claim 13, in which said gain is approximately 0.5.

15. A sound attenuating system as claimed in claim 13, in which said signal processing unit has a phase reversing characteristic and has a variable resonance frequency output therefrom.

16. A sound attenuating system as claimed in claim 4, in which said sound detecting sensor and said secondary sound source are located at substantially the same position and in which said signal processing unit is set to have a low gain.

17. A sound attenuating system as claimed in claim 4, in which a passive element is installed between said sound detecting sensor and said secondary sound source.

18. A sound attenuating system as claimed in claim 4, in which said signal processing unit carries out an adaptive signal processing by which the output from said unit is corrected totally in accordance with the characteristics of the reference signal from said sound detecting sensor.

19. A method for attenuating sound, comprising the steps of:

a) propagating sound from a primary source to a passive silencer through a first conduit, said first conduit having a diameter which is smaller than a diameter of said passive silencer;

b) detecting said sound in said silencer using at least one branched conduit having a microphone;

c) processing said detected sound to generate a phase reversed signal;

d) generating sound from a secondary source located in a side of said passive silencer in response to said phase reversed signal, wherein said secondary sound has a phase opposite to that of said sound from said primary source; and e) propagating any sound not reflected by steps b) through d) from said passive silencer to a second conduit, said second conduit having a diameter which is smaller than a diameter of said passive silencer.

20. A method for attenuating sound as recited in claim 19, further comprising the step of amplifying said phase reversed signal at a low level prior to generating said secondary sound.

21. A sound attenuating system connected between first and second portions of a main conduit, said main conduit propagating sound from a sound source through said first portion of said main conduit to said sound attenuating system, said system comprising:

an expansion chamber positioned between said first and second portions of said main conduit, said expansion chamber receiving said sound propagated from said first portion of said main conduit, a cross-sectional area of said expansion chamber being greater than a cross-sectional area of said first portion of said main conduit;

at least one passive acoustic reflecting surface;

a secondary sound source positioned at a side of said expansion chamber;

a sound detecting sensor positioned between said secondary sound source and a center of said expansion chamber, said sound detecting sensor generating a reference signal; and a control unit driving said secondary sound source according to said reference signal, wherein said sound detecting sensor, said secondary sound source and said control unit are arranged such that an active acoustic reflecting surface is generated within said expansion chamber.

22. A sound attenuating system as recited in claim 21, further comprising a branch conduit extending from said side of said expansion chamber, wherein said secondary sound source is positioned in said branch conduit such that said secondary sound source is recessed from said side of said expansion chamber.

23. A sound attenuating system as recited in claim 21, wherein said expansion chamber is directly connected to said first portion of said main conduit to generate a passive acoustic reflecting surface.

* * * * *